Sept. 24, 1957 J. I. PANKOVE 2,807,558

METHOD OF SEALING A SEMI-CONDUCTOR DEVICE

Filed April 12, 1954

INVENTOR.
JACQUES I. PANKOVE
BY
J. C. Whittaker
ATTORNEY

Patented Sept. 24, 1957

2,807,558

METHOD OF SEALING A SEMI-CONDUCTOR DEVICE

Jacques I. Pankove, Princeton, N. J., assignor to Radio Corporation of America, a corporation of Delaware Application April 12, 1954, Serial No. 422,443

8 Claims. (Cl. 117—213)

Figure 1:
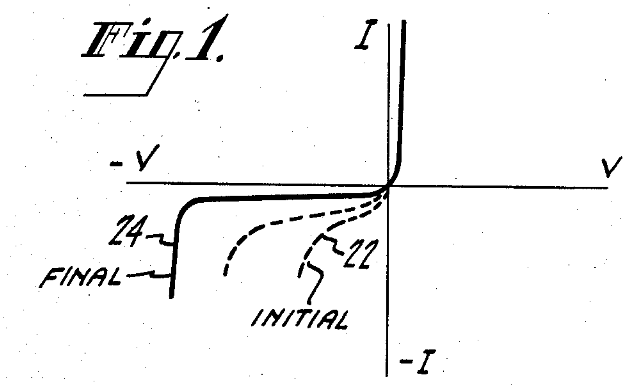

This invention relates to semi-conductor devices having large area rectifying barriers and to methods of treating them. More particularly it relates to methods of improving the electrical characteristics of devices such as transistors, rectifiers and photocells and protecting them from deterioration.

Many semi-conductor devices tend to deteriorate rapidly when exposed to the atmosphere after they are made. Such deterioration may proceed even though the devices are imbedded in a thermosetting resin such as Araldite. The reasons for the deterioration are not definitely known. It is believed, however, that atmospheric moisture affects the surfaces of the devices and that the imbedding resins heretofore utilized not only are incapable of completely sealing out all moisture but also include an indeterminate quantity of absorbed moisture. For this reason many previous devices are enclosed in a hermetically sealed envelope to protect them from atmospheric attack. This procedure, however, is relatively expensive and does not ensure optimum operating characteristics since the devices may be adversely affected by atmospheric attack between the time they are formed and the time they are sealed.

Accordingly, one object of the instant invention is to provide improved methods of making semi-conductor devices.

Another object is to provide improved methods of encapsulating semi-conductor devices to protect them from atmospheric attack.

Another object is to provide semi-conductor devices having improved storage and service lives.

Another object is to provide semi-conductor devices having improved electrical characteristics.

Another object is to provide improved methods of protecting exposed portions of semi-conductor devices.

These and other objects are accomplished by the instant invention according to which semi-conductor devices are protected by a film of paraffin or other inert, electrically insulating, moisture-free and water-impenetrable material placed upon their critical surfaces while electric currents are induced through the devices. The rectifying characteristics of semi-conductor devices are often improved by the passage of current in the back direction through their barriers. It is believed that the reason for the improvement is that most of the reverse current flows through low resistance leakage paths located on the exposed surfaces of the devices. It is also believed that these leakage paths are relatively sensitive to moisture, their effect being increased by the presence of moisture. The flow of the reverse current through these leakage paths is believed to cause localized heating which drives off the moisture and thus minimizes the undesirable effects of the leakage paths. The application of a protective coating to the devices while their surfaces are thus affected prevents the reversion of the surfaces to their previous condition and preserves the devices in their optimum electrical condition.

Figure 2:
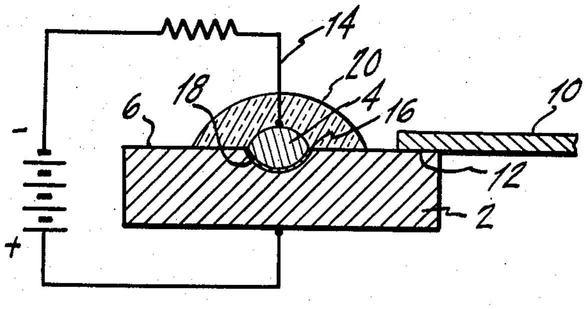

The invention will be described in greater detail in connection with the accompanying drawing of which:

Figure 1 is a series of diagrams of the current-vs.-voltage characteristics of a typical device according to the invention; and Figure 2 is a schematic, elevational, cross-sectional view of a device treated according to the invention.

The following example illustrates the practice of the invention in connection with an alloy junction type diode rectifier. A rectifier such as the crystal diode shown in Figure 2 may be prepared initially according to any known process such as the alloy diffusion process. In this process a wafer 2 of a single crystal of n-type germanium is cut to size and etched to expose a clean, crystallographically undisturbed surface. Before etching the wafer may be, for example, about 0.125" x 0.125" x .010" thick. It is etched in a solution comprising a mixture of hydrofluoric and nitric acids to reduce its thickness to about .006". An electrode pellet 4 of an impurity material such as indium about .03" in diameter and .005" thick is placed on one surface 6 of the wafer. The wafer and the pellet are heated together for a few minutes at about 500° C. to alloy the pellet to the wafer and to form a p-n rectifying barrier 18 within the wafer. A base lead 10 is attached by a non-rectifying solder connection 12 to the wafer and an electrode lead 14 is attached to the alloyed electrode. The device is etched to expose the peripheral edges 16 of the barrier that lie along the surface of the wafer. During the alloying process the surfaces of the wafer and, particularly, the peripheral portions of the barrier are generally contaminated by electrode material which flows along the surface of the wafer. This material also vaporizes during the process and may settle in an uncontrolled fashion upon the surface. Etching removes this excess material and restores the surface to a clean condition.

After the electrical leads are attached to the electrode and the base, the device is mounted on a stem. According to previous practice the mounted device is directly covered with a wax or lacquer and encapsulated in a resin or an evacuated envelope. According to the invention, however, an electric current is first passed in the back direction, i. e., in the direction of greatest electrical resistance, across the barrier of the device for a few seconds and a coating of a protective material 20 is then placed upon the device to seal it while the current flow is maintained. The protective material may be any inert, electrically insulating, moisture-free and moisture-impervious material such as paraffin or other high melting point wax. The coating may be a film that covers the entire device or may be restricted to the electrode and a region of the base adjacent to the electrode. It is important, however, that the exposed portions of the barrier be covered by the material. The protective material may be applied by dipping the device in a molten mass of the material or, alternatively, a drop of the material may be placed upon the surface of the device. The manner of application may be selected according to convenience and is not critical.

After the device is thus protected it may be potted according to any known technique.

To insure more accurate control and to permit simultaneously testing the device while it is being treated, a varying, or variable instead of a constant potential may be applied in the back direction across the barrier. The instantaneous values of the currents induced by the potential may be compared as a function of the potential and, thus, the operational characteristics of the device may be observed before the device is sealed and potted.

In many cases the electrical characteristics of devices such as the alloy junction diode heretofore described are relatively unsatisfactory even after they have been etched.

Generally the characteristics may be improved if, when the devices are mounted and before they are sealed, the barriers of the devices are subjected to a potential in the back direction for a few seconds. For example, a typical alloy junction type diode may have an initial back-direction characteristic as shown by curve 22 of Figure 1, the "knee" of the curve being at about 10 to 20 volts or less. When the device is subjected to a back direction potential of about 15 to 30 volts or, alternatively, subjected to an alternating potential of a similar peak amplitude its characteristic improves rapidly until it conforms to curve 24 and exhibits a breakdown voltage of about 70 volts or more. If the device is exposed to the atmosphere or to moisture after the potential is removed and before it is sealed the characteristic is apt rapidly to deteriorate again. The device is sealed, therefore, before the potential is removed to preserve the characteristic at its optimum condition.

Although it is not definitely understood why the practice of the invention provides improved electrical characteristics and service life in semi-conductor devices, it is presently believed that these results may be attributed to the removal of a film of moisture from the surfaces of the devices. It appears likely that when the devices are exposed to the atmosphere microscopically thin films of moisture form upon their surfaces and provide electrical leakage paths which tend to short-circuit the barriers. When the barriers are biased in their reverse directions the moisture films conduct a relatively large proportion of the total induced currents and are heated by the currents. The heating vaporizes the films and destroys them. If the bias is removed from the barriers before the devices are sealed, the films of moisture tend rapidly to reform, but once the surfaces of the devices are protected by a moisture-free and moisture-impervious coating before the bias is removed new moisture films are prevented from forming on the devices.

The practice of the invention is applicable to all semi-conductor devices that are sensitive to atmospheric or other vaporous exposure. A protective coating may be made relatively thin and transparent and thus the invention is particularly applicable in the manufacture of photosensitive devices wherein it may be desired to provide atmospheric protection for the semi-conductor surfaces without sealing them from light.

There have thus been described improved semi-conductor devices and methods of sealing such devices to protect them from atmospheric attack, and to improve their operational characteristics.

What is claimed is:

1. A method of sealing a semi-conductor device including a rectifying barrier comprising the steps of applying a potential in the back direction across said barrier sufficient to generate heat enough to prevent deposition of moisture thereon and then coating said device with an insulating moisture-impervious, inert material while maintaining said potential.

2. A method of sealing a semi-conductor device including a rectifying barrier comprising the steps of applying a potential in the back direction across said barrier for at least a few seconds and sufficient to generate heat enough to prevent deposition of moisture thereon to improve the electrical characteristics of said device and then coating said device with an insulating moisture-impervious, inert material while maintaining said potential.

3. A method of sealing a semi-conductor device including a rectifying barrier comprising the steps of applying a potential in the back direction across said barrier for at least a few seconds and sufficient to generate heat enough to prevent deposition of moisture thereon and then coating said device with paraffin while maintaining said potential.

4. A method of sealing a semi-conductor device including a rectifying barrier comprising the steps of applying an electric potential in the back direction across said barrier for at least a few seconds and sufficient to generate heat enough to prevent deposition of moisture thereon and contacting a quantity of molten paraffin to the surface of said device while maintaining said potential.

5. In a method of sealing a semi-conductor device to protect it from the atmosphere, said method comprising coating said device with an insulating, moisture-impervious material, the improvement comprising the steps of inducing an electric current in said device in the direction of greatest electrical resistance, said current being sufficient to generate heat enough to prevent deposition of moisture on said device, and maintaining said current for at least a few seconds prior to and including the time of said coating step.

6. A method of sealing a semi-conductor device including a body of a semi-conductive material and a large area rectifying barrier disposed therein, peripheral portions of said barrier being disposed upon the surface of said body, said method comprising electrical heating said surface to drive off moisture therefrom by the application of an electric potential in the back direction across said barrier for at least a few seconds, and enclosing said device within a moisture-impervious envelope while maintaining said surface in a heated condition by maintaining said potential.

7. A method of sealing a semi-conductor device including a body of a semi-conductive material and a rectifying barrier disposed in said body, said method comprising drying the surface of said body by the application of an electric potential in the reverse direction across said barrier for at least a few seconds and enclosing said device within a moisture-impervious envelope while maintaining said surface in a moisture-free condition by maintaining said potential.

8. A method of sealing a semi-conductor device including a body of a semi-conductive material and a rectifying barrier in said body, said method comprising electrically heating said body to drive off moisture from the surface thereof by the application of an electric potential in the reverse direction across said barrier for at least a few seconds, maintaining said surface in a moisture-free condition by maintaining said potential, and enclosing said device within a moisture-impervious envelope while maintaining said surface in said moisture-free condition by maintaining said potential.

References Cited in the file of this patent

UNITED STATES PATENTS

| | | |
|---|---|---|
| 1,163,342 | Hurley et al. | Dec. 7, 1915 |
| 2,437,995 | Blackburn | Mar. 16, 1948 |
| 2,502,540 | Van Amstel | Apr. 4, 1950 |
| 2,753,497 | Jenkins et al. | July 3, 1956 |